Whitaker v Read.
Mower.
No. 896 Reissued Feb. 7. 1860.
Fig 1.
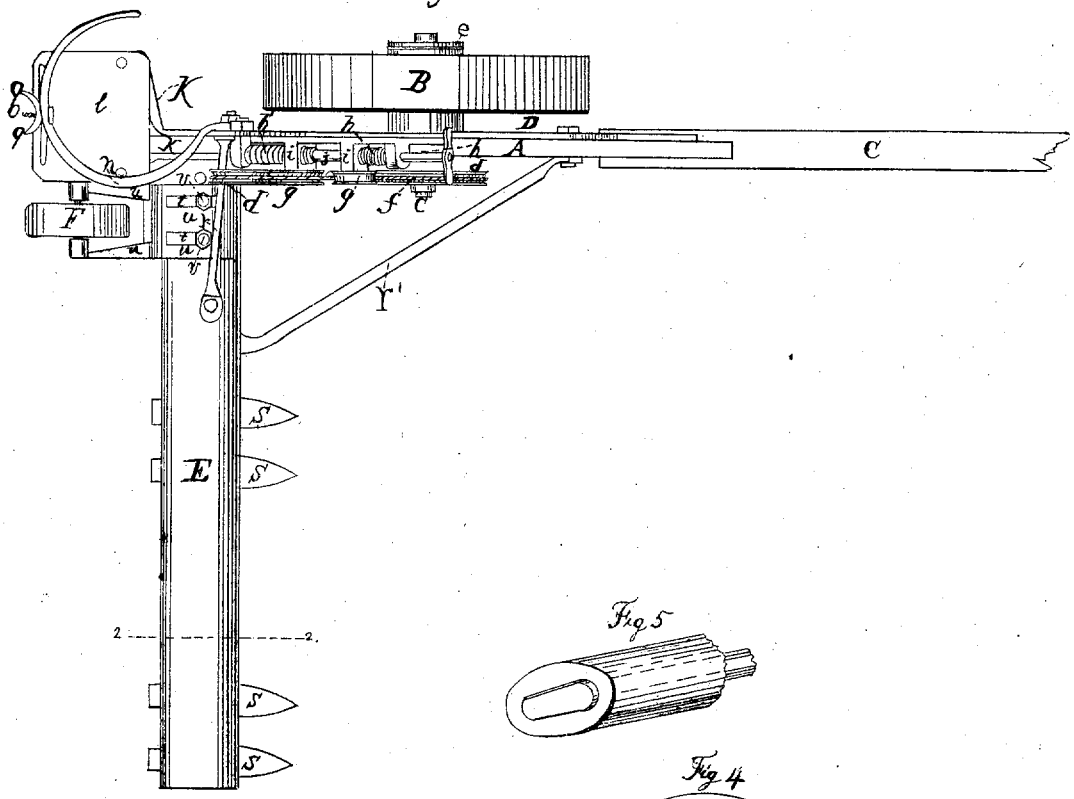
Fig 5
Fig 4
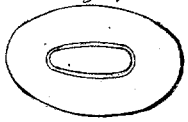
Fig 2.
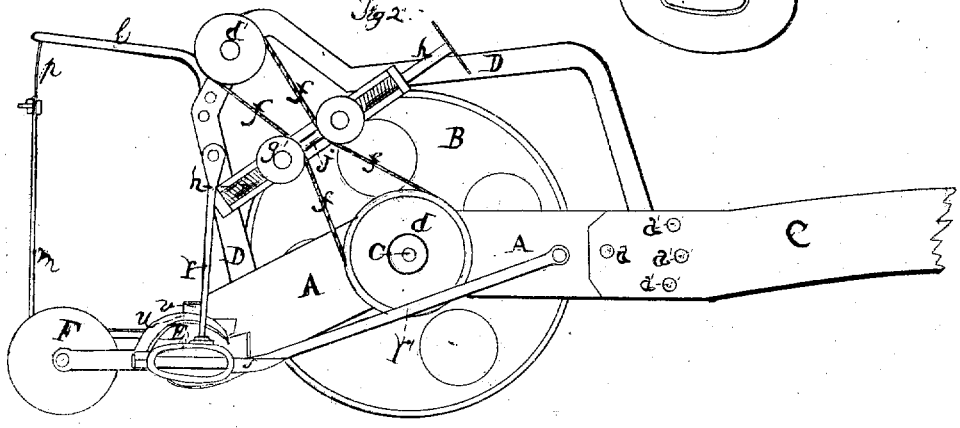
Fig 3.
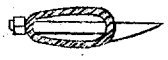

UNITED STATES PATENT OFFICE.

J. T. WHITAKER AND C. D. READ, OF ST. CHARLES, ILLINOIS.

IMPROVEMENT IN REAPING AND MOWING MACHINES.

Specification forming part of Letters Patent No. 17,990, dated August 11, 1857; Reissue No. 896, dated February 7, 1860.

*To all whom it may concern:*

Be it known that we, JOHN T. WHITAKER and CALVIN D. READ, of St. Charles, in the county of Kane and State of Illinois, have invented a certain new and useful Improvement in the Construction of the Finger-Bar of Reaping and Mowing Machines, of which the following is a full, clear, and exact description, reference being had to the accompanying drawings, making part of this specification, in which—

Figure 1 represents a plan of such parts of a mowing-machine to which our improvement relates; Fig. 2, a side elevation of the same; Fig. 3, a transverse vertical section of the finger-bar, taken through the line 2 2 of Fig. 1; Fig. 4, an end view of the blank finger-bar previous to being rolled out; and Fig. 5, a view in perspective of a part of the same and mandrel broken off.

Our invention consists in the use of a rolled tubular finger-bar of peculiar form and construction, whereby the efficiency and strength of the machine are greatly increased and its weight materially lessened.

To enable others skilled in the art to make, construct, and use our invention, we will now proceed to describe it in detail, together with such parts of a harvesting-machine as are essential for this purpose.

In the accompanying drawings, A represents the side beam for the support of the driving-wheel B and reel, the tongue C being also attached to its forward end, there being one center bolt-hole, *a*, formed in it, to which the tongue is pivoted, and a series of holes, *a'*, arranged in advance of it in the arc of a circle, of which the former is the center, through either of which a bolt is passed for the purpose of attaching the pole rigidly to the beam, according as circumstances may require—that is to say, when it is desired to keep the cutters close to the ground, then it is passed through the upper hole, and vice versa. Upon the outer side of the beam A, near its center, is riveted or otherwise formed a hollow collar, upon which is mounted the driving or ground wheel. Through this collar is passed a shaft, *c*, upon the inner end of which a pulley, *d*, is secured that gives motion to the pulley *d'* of the reel through the belt *f*. When the belt *f* becomes too loose two pulleys or friction-rolls, *g* and *g'*, are so arranged, one on either side of the belt, that by turning a right-and-left screw, *h*, upon which they are mounted, the belt will be made tight, or vice versa. The studs *i*, upon which the friction-rolls are mounted, are formed with guide-pins, which work in slots or guideways *j*, secured to the frame-piece D, that supports the reel, to prevent them from turning on the shank of the screw, thus keeping them in the proper position to perform their work.

To the rear end of the beam A a small frame, K, is secured, to which the stand *l*, that supports the raker, is fastened. From the rear end of this platform rise two standards, *m*, which connect at the top in such manner as to form a bent bar whose ends are secured in the raker's platform *l*. To the upper end of this bar, formed by its curve, is secured a rest, *n*, for the raker, by means of a screw-bolt, *o*, passing through a slot in the standard *p* of the rest, and a wing-nut, *q*, one end of the rest being secured to the standard D, upon which the reel is mounted, thus giving to it a firm support. This rest is made adjustable by means of the slot and bolt before described, so as to adapt it to the various heights of rakers using it.

Upon the inner side and rear end of the frame-beam A is formed a projection of such form as to enter and fit the cavity of the inner end of the tubular finger-bar E. The latter, if deemed advisable, may be shrunk upon it for the purpose of giving to it a stronger attachment, a bolt for the same purpose being passed through the finger-bar and projection, and secured in any suitable manner, it being also supported and stayed to the frame by means of braces *r* and *r'*, suitably arranged to prevent rearward and vertical deflection of the finger-bar. In making this tubular finger-bar a mass of metal of sufficient size to make a bar is first taken (see Fig. 4) and placed upon a mandrel, 1, Fig. 5, an orifice for its reception having been previously made, and then rolled out to the proper size and shape (slightly tapering) and length required by suitable machinery for the purpose, and which it is deemed here unnecessary to describe. Through the front and rear sides of the finger-bar are pierced a series of holes at regular intervals apart, for the reception of the tangs of the fingers *s*, upon the end of which is cut a screw-thread, by means of which and a nut, *s'*, they are secured to the finger-bar.

Upon the end of the finger-bar next the main frame is secured a curved plate, *t*, whose under side conforms to the shape of the finger-bar, (which is slightly flattened, its transverse section being oval,) while its upper or convex side forms the arc of a circle. Upon this plate is fitted the curved frame *u* of a wheel, F, for the support of the finger-bar, to which it is attached by means of the bolts *v*, which pass through the finger-bar E, plate *t*, and slots in the wheel-frame. This wheel serves to support the rear end of the machine, and also to raise and lower the finger-bar as required, the latter being effected by means of the slot and screw-bolts, and the curved form of its frame, and the curved plate, thereby permitting the frame to turn in the latter, and thus regulate the height of the finger-bar from the ground.

Having thus described our invention, what we claim as new, and desire to secure by Letters Patent, is—

A tubular finger-bar when constructed in the peculiar manner and for the purposes substantially as herein set forth.

In testimony whereof we hereunto set our hands.

JOHN T. WHITAKER.
CALVIN D. READ.

Witnesses:
ALEX. V. SILL,
T. H. COLLINS.